United States Patent
Chen et al.

(10) Patent No.: US 11,851,534 B2
(45) Date of Patent: Dec. 26, 2023

(54) RECYCLED FIBER MATERIAL AND METHOD

(71) Applicant: SRAM, LLC, Chicago, IL (US)

(72) Inventors: Hung I Chen, Taichung (TW); Chia-Chang Chang, Taichung (TW); Ching-Han Liu, Taichung (TW); Huan-Ching Hsu, Taichung (TW)

(73) Assignee: SRAM, LLC, Chicago, IL (US)

( * ) Notice: Subject to any disclaimer, the term of this patent is extended or adjusted under 35 U.S.C. 154(b) by 151 days.

(21) Appl. No.: 17/020,357

(22) Filed: Sep. 14, 2020

(65) Prior Publication Data

US 2021/0079191 A1 Mar. 18, 2021

Related U.S. Application Data

(60) Provisional application No. 62/900,977, filed on Sep. 16, 2019.

(51) Int. Cl.
   *C08J 11/04* (2006.01)

(52) U.S. Cl.
   CPC ............ *C08J 11/04* (2013.01); *C08J 2363/00* (2013.01); *C08J 2375/00* (2013.01); *C08J 2463/00* (2013.01); *C08J 2475/00* (2013.01)

(58) Field of Classification Search
   CPC .... C08J 11/04; C08J 2375/00; C08J 2463/00; C08J 2475/00; C08J 2363/00
   USPC .......................................................... 523/200
   See application file for complete search history.

(56) References Cited

U.S. PATENT DOCUMENTS

| | | |
|---|---|---|
| 8,298,359 B2 | 10/2012 | Inserra Imparato et al. |
| 9,352,967 B2 | 5/2016 | Christ et al. |
| 2005/0266222 A1 | 12/2005 | Clark et al. |
| 2013/0217806 A1 | 8/2013 | Gehringer |
| 2015/0148485 A1 | 5/2015 | Yohannes et al. |
| 2016/0214278 A1 | 7/2016 | Dauner |

FOREIGN PATENT DOCUMENTS

| | | | |
|---|---|---|---|
| CN | 105733259 A1 | 7/2016 | |
| CN | 107082584 A1 | 8/2017 | |
| CN | 108136619 A1 | 6/2018 | |
| CN | 108883587 | 11/2018 | |
| CN | 109897216 A1 | 6/2019 | |
| WO | WO-2017171753 A1 * | 10/2017 | ............ B29B 17/02 |
| WO | WO-2017222815 A1 * | 12/2017 | ......... B29B 17/0026 |

* cited by examiner

*Primary Examiner* — David T Karst

(57) ABSTRACT

A method for preparing a fiber-containing molding compound includes the acts of a) providing a composite material which includes a first resin and fibers impregnated with the first resin, and b) mixing the composite material with a treatment medium which includes a diluent to form a mixture. The fiber-containing molding compound thus prepared has an adjustable fiber content.

23 Claims, 2 Drawing Sheets

Providing a composite material — a

Mixing the composite material with a treatment medium — b

RECYCLED FIBER MATERIAL AND METHOD

PRIORITY

This application claims the benefit of U.S. Provisional Patent Application No. 62/900,977, filed on Sep. 16, 2019, which is hereby incorporated by reference in its entirety.

FIELD

The disclosure relates to a method for preparing a fiber-containing molding compound, and more particularly to a method for preparing a fiber-containing molding compound having an adjustable fiber content.

BACKGROUND

Carbon fibers have several advantages such as high stiffness, high tensile strength, low weight, high chemical resistance, and the like, which made them to be very popular in various applications including aerospace, civil engineering, military, motorsports, etc. Carbon fibers are usually combined with other materials to form a composite. For example, the carbon fibers can be impregnated with a resin such as an epoxy resin to prepare a prepreg.

The prepreg is a composite material in a sheet or strand form, and includes a resin matrix such as a thermoset resin matrix (for example, an epoxy resin matrix), and fibers such as carbon fibers, glass fibers, or the like that are impregnated with the resin matrix.

In the machining of composite parts, a sheet form of a prepreg material is cut to obtain prepreg parts for further processing, and a substantial amount of prepreg scraps (i.e., remnant of uncured prepreg material) is formed thereby. Prepreg scraps are considered to be a hazardous waste and disposal thereof may be costly for manufacturers. In addition, the disposal of the prepreg scraps may cause a revenue loss due to the fact that some of the fibers and uncured resin in the prepreg scraps are still usable. Therefore, recycling of the prepreg scraps may recover some usable components contained therein so as to reduce production cost, and is environmentally friendly as well.

Various methods have been developed to recycle and reuse the prepreg scraps. For example, U.S. Pat. No. 8,298,359 B2 discloses a method for manufacturing a recycled prepreg material in a strip form. The method includes the steps of: supplying an input charge of flat scraps from a prepreg starting material, and recording an overall area of the scraps of the input charge; fragmenting the scraps by cutting so as to obtain cut fragments of predetermined size, supplying a strip of backing material and a strip of protective material; distributing in a random manner the cut fragments on the strip of backing material, the feeding speed of the strip of backing material being adjusted depending on the recorded area of the incoming scraps, so that the cut fragments form a substantially homogeneous layer in which the fibers are distributed in a near-isotropic manner with respect to the surface of the strip of backing material; arranging the strip of protective material over the cut fragments distributed on the strip of backing material; and compacting the strip of protective material, the cut fragments, and the strip of backing material so as to form a strip of recycled prepreg material which has substantially constant area weight and thickness.

In addition, U.S. Patent Publication No. 2016/0214278 A1 discloses a method for manufacturing a semi-finished product to be made into a carbon fiber-reinforced component in a continuous process. The method includes the steps of: feeding carbon fiber scraps into an extruder, adding a plastic polymer to the extruder; pulverizing the carbon fiber scraps and blending the pulverized scraps with the plastic polymer to form a polymer mass; and impregnating the polymer mass with a resin in order to form a regrind prepreg.

Furthermore, U.S. Pat. No. 9,352,967 B2 discloses a method for manufacturing a molded part from carbon containing carbon fibers. The method includes the steps of: comminuting waste parts formed from a carbon fiber-reinforced composite material or scrap parts formed from a carbon fiber-reinforced composite material to result in a comminuted product, releasing a matrix and the carbon fibers of the carbon fiber-reinforced composite material from each other during or after the comminuting step, wherein a release of the matrix from the carbon fibers is accomplished by contacting the parts with an acid, a caustic substance, or a solvent; producing a mixture from the comminuted product, a binder, and a carbon material, wherein the mixture contains less than 20% by weight of the carbon fibers; molding the mixture into the molded part; and carbonizing the molded part.

In the aforesaid prior art, a resin content in the products manufactured thereby is limited by the resin content in the prepreg waste or the prepreg scraps, and thus cannot be adjusted according to specific requirements of the products. Therefore, it is desirable to provide a method for manufacturing a product from the prepreg waste or the prepreg scraps, so that the resin content in the product manufactured thereby is adjustable.

SUMMARY

Therefore, an object of the disclosure is to provide a method for preparing a fiber-containing molding compound having an adjustable fiber content.

According to the disclosure, there is provided a method for preparing a fiber-containing molding compound, which includes the acts of:
a) providing a composite material which includes a first resin and fibers impregnated with the first resin; and
b) mixing the composite material with a treatment medium which includes a diluent to form a mixture.

In the method for preparing a fiber-containing molding compound according to the disclosure, the composite material including the first resin and the fibers impregnated with the first resin is mixed with the treatment medium including the diluent, such that the fiber-containing molding compound prepared thereby can have a fiber content that is adjustable according to specific requirements, and can possess satisfactory mechanical properties for further processing together with other molding material(s) to produce various molded articles.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
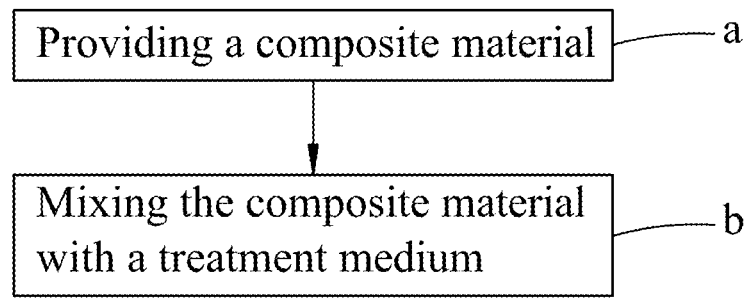
FIG. 1 is a flow diagram of a method for preparing a fiber-containing molding compound according to the disclosure.

Referring to FIG. 1, a method for preparing a fiber-containing molding compound according to the disclosure includes the acts of:
a) providing a composite material which includes a first resin and fibers impregnated with the first resin; and
b) mixing the composite material with a treatment medium which includes a diluent to form a mixture.

The term "a fiber-containing molding compound" as used herein refers to a molding compound which is composed of a resin matrix (for example, an epoxy resin matrix or the like) and short fibers (for example, short carbon fibers, short glass fibers, or the like) impregnated with the resin matrix, and is known as a bulk molding compound (BMC), a sheet molding compound (SMC), or the like.

In certain embodiments, the composite material used in act a) includes composite fragments, each of which is in a form of a partially cured construction of the first resin and the fibers. In certain embodiments, composite fragments are prepreg fragments, and more specifically are prepreg waste fragments.

In certain embodiments, the method for preparing a fiber-containing molding compound according to the disclosure further includes prior to act a), an act of fragmenting composite scraps (for example, prepreg scraps, and more specifically prepreg waste scraps) by cutting to obtain the composite fragments. The prepreg waste scraps are produced from machining a fiber prepreg material. In certain embodiments, the fiber prepreg material is a uni-directional fiber prepreg material.

In act a), the fibers contained in the composite material have an average fiber length which is determined according to the fiber-containing molding compound desirably to be prepared. In certain embodiments, the average fiber length of the fibers contained in the composite material is in a range from 1 mm to 5 cm. In certain embodiments, the average fiber length of the fibers contained in the composite material is in a range from 3 mm to 3 cm. In certain embodiments, the average fiber length of the fibers contained in the composite material is in a range from 1 cm to 2 cm.

Examples of the fibers contained in the composite material include, but are not limited to, carbon fibers, glass fibers, Kevlar fibers, basalt fibers, and aromatic polyamide fibers. In certain embodiments, the fibers are carbon fibers.

In certain embodiments, the treatment medium used in act b) includes the diluent and a resin-based material which includes a resin hardener and a second resin that is miscible with the first resin, such that a reaction equivalent ratio of a combination of the first resin, the second resin, and the diluent to the resin hardener in the mixture formed in act b) is in a range from 0.1:1 to 10:1. In certain embodiments, the reaction equivalent ratio is in a range from 0.5:1 to 2:1. In certain embodiments, the reaction equivalent ratio is in a range from 0.8:1 to 1.2:1. In certain embodiments, the reaction equivalent ratio is 1:1.

In certain embodiments, in act b), the resin-based material is used in an amount ranging from 10 wt % to 90 wt % based on a total weight of the fiber-containing molding compound. In certain embodiments, the resin-based material is used in an amount ranging from 15 wt % to 70 wt % based on a total weight of the fiber-containing molding compound. In certain embodiments, the resin-based material is used in an amount ranging from 20 wt % to 50 wt % based on a total weight of the fiber-containing molding compound.

In certain embodiments, the second resin in the resin-based material is in an amount ranging from 20 wt % to 90 wt % based on a weight of the resin-based material. In certain embodiments, the second resin in the resin-based material is in an amount ranging from 20 wt % to 70 wt % based on a weight of the resin-based material. In certain embodiments, the second resin in the resin-based material is in an amount ranging from 20 wt % to 50 wt % based on a weight of the resin-based material.

In certain embodiments, the second resin included in the resin-based material is the same as the first resin included in the composite material.

In certain embodiments, both the first resin and the second resin are selected from the group consisting of epoxy-based resin, phenolic-based resin, unsaturated polyester-based resin, furan-based resin, vinyl ester-based resin, polyurethane-based resin, and combinations thereof.

In certain embodiments, both the first resin and the second resin are epoxy-based resin.

Examples of the diluent used in act b) include a reactive diluent, a non-reactive diluent, and a combination thereof. The non-reactive diluent is used for reducing viscosity of the mixture so as to enhance the processing of the mixture. In addition to reduce the viscosity of the mixture, the reactive diluent may be involved in a cross-linking reaction with the resin hardener.

In certain embodiments, the diluent used in act b) is the reactive diluent and is used in an amount ranging from 5 wt % to 25 wt % based on a total weight of the fiber-containing molding compound.

In certain embodiments, the diluent used in act b) is the non-reactive diluent and is used in an amount ranging from 5 wt % to 15 wt % based on a total weight of the fiber-containing molding compound.

In certain embodiments, the diluent used in act b) is the combination of the reactive diluent and the non-reactive diluent, which are used in amounts ranging from 5 wt % to 25 wt % and from 5 wt % to 15 wt %, respectively, based on a total weight of the fiber-containing molding compound.

In certain embodiments, in which the non-reactive diluent is used, the method for preparing the fiber-containing molding compound according to the disclosure further includes after act b), an act of removing the non-reactive diluent from the mixture.

Examples of the reactive diluent suitable for the method for preparing a fiber-containing molding compound according to the disclosure include, but are not limited to, neopentyl glycol diglycidyl ether, cresyl glycidyl ether, benzyl glycidyl ether, 1,6-hexanediol diglycidyl ether, polypropylene glycol diglycidyl ether, fatty glycidyl ether, ethylene glycol diglycidyl ether, phenyl glycidyl ether, 1,4-butanediol diglycidyl ether, butyl glycidyl ether, alkylene glycidyl ether, styrene, methylstyrene, and methacrylic acid monomer. The examples of the reactive diluent can be used alone or in admixture of two or more.

Examples of the non-reactive diluent suitable for the method for preparing the fiber-containing molding compound according to the disclosure include, but are not limited to, acetone, butanone, toluene, xylene, ethanol, dimethyl formamide, ethyl acetate, butyl acetate, and benzyl alcohol. The examples of the non-reactive diluent can be used alone or in admixture of two or more.

A temperature for implementing act b) may be adjusted according to the resin-based material and the diluent (i.e., the reactive diluent, the non-reactive diluent, and a combination thereof) specifically used in act b). It should be noted that when the temperature is too low, the composite material cannot be evenly mixed with the diluent and the resin-based material, leading to difficult preparation of the fiber-containing molding compound. On the other hand, when the temperature is too high, an excessive curing reaction between the resin hardener with the first resin, the second resin and/or the reactive diluent may occur, which also lead to difficult preparation of the fiber-containing molding compound. In certain embodiments, the temperature for implementing act b) is in a range from 10° C. to 100° C. In certain embodiments, the temperature for implementing act b) is in a range from 20° C. to 90° C. In certain embodiments, the temperature for implementing act b) is in a range from 25° C. to 80° C.

Various mixing devices well known in the art may be used for implementing act b), and examples thereof include, but are not limited to, a homogenizer and a kneader.

Various fillers well known in the art may be optionally used in act b). Examples of the fillers include, but are not limited to, mica, talc, kaolin, diatomaceous earth, bentonite, sepiolite, green earth, montmorillonite, wollastonite, silica, calcium carbonate, clay, molybdenum disulfide, titanium oxide, zinc oxide, antimony oxide, calcium polyphosphate, graphite, barium sulfate, magnesium sulfate, zinc borate, and polymeric compounds.

Various additives well known in the art may be optionally used in act b). Examples of the additives include, but are not limited to, conductivity-imparting materials, for example, metals, metal oxides, carbon black, graphite powders, or the like; halogenated flame retardants, for example, brominated resins and antimony-based flame retardants, for example, antimony trioxide, antimony pentaoxide, or the like; phosphorus-based flame retardants, for example, ammonium polyphosphate, aromatic phosphate, phosphorus red, or the like; organic acid metal salt-based flame retardants, for example, organic boric acid metal salts, organic phosphoric acid metal salts, aromatic sulfonimide metal salts, or the like; inorganic flame retardants, for example, zinc borate, zinc, zinc oxide, zirconium compounds, or the like; nitrogen-based flame retardants, for example, cyanuric acid, isocyanuric acid, melamine, melamine cyanurate, melamine phosphate, guanidine nitride, or the like; fluorine-based flame retardants, for example, polytetrafluroethylene, or the like; silicone-based flame retardants, for example, polysilosane, or the like; metal hydroxide-based flame retardants, for example, aluminum hydroxide, magnesium hydroxide, or the like; flame retardant aids, for example, cadmium oxide, zinc oxide, cuprous oxide, cupric oxide, ferrous oxide, ferric oxide, cobalt oxide, manganese oxide, molybdenum oxide, tin oxide, titanium oxide, or the like; colorants; pigments; slip agents; mold release agents; surfactants; dispersants; nucleating agents, for example, mica, talc, kaolin, or the like; plasticizers, for example, phosphate, or the like; thermal stabilizers; antioxidants; anti-coloring agents; UV-absorbing agents; flow modifiers; foaming agents; antibacterial agents; deodorants; slip modifiers; and antistatic agents, for example, polyether ester amides, or the like.

In certain embodiments, the mixture obtained in act b) is the fiber-containing molding compound which is in a form of a bulk molding compound.

In certain embodiments, the method for preparing the fiber-containing molding compound according to the disclosure further includes, after act b), an act of subjecting the bulk molding compound to a B-stage curing treatment.

In certain embodiments, the method for preparing the fiber-containing molding compound according to the disclosure further includes, after act b), an act c) of preforming the mixture to obtain the fiber-containing molding compound. In certain embodiments, act c) is implemented by pressing the mixture to obtain the fiber-containing molding compound which is in a form of a sheet molding compound.

In certain embodiments, the method for preparing a fiber-containing molding compound according to the disclosure further includes, after act c), an act of subjecting the sheet molding compound to the B-stage curing treatment.

A baking temperature and a baking time period for the B-stage curing treatment can be adjusted according to the resin-based material and the diluent (i.e., the reactive diluent, the non-reactive diluent, and a combination thereof) specifically used in act b). It should be noted that when the baking temperature is too high or the baking time period is too long, the fiber-containing molding compound may be fully cured and thus cannot be further processed together with other molding material(s) to produce various molded articles. On the other hand, when the baking temperature is too low or the baking time period is too short, the fiber-containing molding compound thus obtained may be too viscous to be further processed together with other molding material(s) to produce various molded articles. In certain embodiments, the baking temperature is in a range from 70° C. to 160° C., and the baking time period is in a range from 1 minute to 60 minutes.

The fiber-containing molding compound prepared by the method according to the discourse can be used for further processing together with other molding material(s) to produce various molded articles.

Examples of the molded articles include, but are not limited to, electrical parts, electronic parts, architectural components, automotive interior parts, automotive panels, aircraft parts, and the like.

Examples of the disclosure will be described hereinafter. It is to be understood that these examples are exemplary and explanatory and should not be construed as a limitation to the disclosure.

Example 1

A uni-directional carbon fiber prepreg material (Manufacturer: Advanced International Multitech Co. Ltd., Taiwan; a resinous material in the prepreg material is an epoxy resin-based material, hereinafter referred to as a first epoxy resin-based material; a weight ratio of carbon fibers to the first epoxy resin-based material is 63:37) was fragmented by cutting to form prepreg fragments (size: 1 inch×1 inch). The prepreg fragments were placed in a beaker, and a release paper-removing agent (Epocide 01, commercially available from Neusauber Inc., Taiwan) was added into the beaker in an amount sufficient to immerse the prepreg fragments therein, followed by stirring to separate release papers from the prepreg fragments and then removing the release paper-removing agent together with the release papers to obtain a viscous blend of the first epoxy resin-based material and the carbon fibers (a content of the first epoxy resin-based material: 30 wt %). After that, 100 g of the viscous blend was placed in another beaker, followed by adding 40 g of a second epoxy resin-based material (Resin P, commercially available from Advanced International Multitech Co. Ltd., Taiwan) and 21 g of methyl ethyl ketone (i.e., a non-reactive diluent) to obtain a mixture. The mixture was heated at 70° C. for 30 minutes to evaporate methyl ethyl ketone therefrom, followed by being conveyed between two kneading rollers so as to obtain a sheet molding compound (140 g, a carbon fiber content: 50 wt %).

Figure 2:
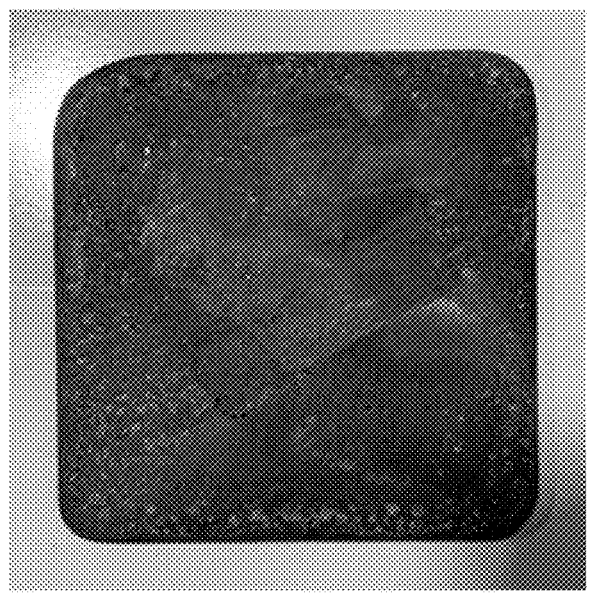
FIG. 2 is a photograph image of a sheet molding compound of Example 1.

A photograph image of the sheet molding compound is shown in FIG. 2.

Example 2

The prepreg fragments obtained in Example 1 (size: 1 inch×1 inch) were placed in a beaker, and a release paper-removing agent (Epocide 02, commercially available from Neusauber Inc., Taiwan) was added into the beaker in an amount sufficient to immerse the prepreg fragments therein, followed by stirring to separate release papers from the prepreg fragments and then removing the release paper-removing agent together with the release papers to obtain a viscous blend of the first epoxy resin-based material and the carbon fibers (a content of the first epoxy resin-based material: 5 wt %). After that, 100 g of the viscous blend was placed in another beaker, followed by adding 90 g of a second epoxy resin-based material (Resin P, commercially available from Advanced International Multitech Co. Ltd., Taiwan) and 9.5 g of methyl ethyl ketone to obtain a mixture. The mixture was heated at 70° C. for 30 minutes to evaporate methyl ethyl ketone therefrom, followed by being conveyed between two kneading rollers so as to obtain a sheet molding compound (190 g, a carbon fiber content: 50 wt %).

Example 3

The prepreg fragments obtained in Example 1 (size: 1 inch×1 inch) were placed in a beaker, and a release paper-removing agent (Epocide 01, commercially available from Neusauber Inc., Taiwan) was added into the beaker in an amount sufficient to immerse the prepreg fragments therein, followed by stirring to separate release papers from the prepreg fragments and then removing the release paper-removing agent together with the release papers to obtain a viscous blend of the first epoxy resin-based material and carbon fibers (a content of the first epoxy resin-based material: 30 wt %). After that, 100 g of the viscous blend was placed in another beaker, followed by adding 33 g of a second epoxy resin-based material (containing epoxy resin and blocked amine hardener in a weight ratio of 6.67:1) and 7 g of ethylene glycol diglycidyl ether (i.e., a reactive diluent) to obtain a mixture. The mixture was conveyed between two kneading rollers to obtain a sheet molding compound (140 g, a carbon fiber content: 50 wt %).

Example 4

The prepreg fragments obtained in Example 1 (size: 1 inch×1 inch) were placed in a beaker, and a release paper-removing agent (Epocide 02, commercially available from Neusauber Inc., Taiwan) was added into the beaker in an amount sufficient to immerse the prepreg fragments therein, followed by stirring to separate release papers from the prepreg fragments and then removing the release paper-removing agent together with the release papers to obtain a viscous blend of the first epoxy resin-based material and carbon fibers (a content of the epoxy resin-based material: 5 wt %). After that, 100 g of the viscous blend was placed in another beaker, followed by adding 42.5 g of a second epoxy resin-based material (containing epoxy resin and blocked amine hardener in a weight ratio of 3.4:1) and 47.5 g of ethylene glycol diglycidyl ether to obtain a mixture. The mixture was conveyed between two kneading rollers to obtain a sheet molding compound (190 g, a carbon fiber content: 50 wt %).

Example 5

Procedures of Example 2 were repeated, except that the weight of the second epoxy resin-based material was changed from 90 g to 850 g and the weight of methyl ethyl ketone was changed from 9.5 g to 142.5 g, thereby obtaining a sheet molding compound (950 g, a carbon fiber content: 10 wt %).

Example 6

Procedures of Example 1 were repeated, except that the weight of the second epoxy resin-based material was changed from 40 g to 600 g and the weight of methyl ethyl ketone was changed from 21 g to 35 g, thereby obtaining a sheet molding compound (700 g, a carbon fiber content: 10 wt %).

Example 7

Procedures of Example 2 were repeated, except that 9.5 g of methyl ethyl ketone was replaced with 237.5 g of ethylene glycol diglycidyl ether and 90 g of the second epoxy resin-based material was replaced with 612.5 g of an another second epoxy resin-based material (containing epoxy resin and blocked amine hardener in a weight ratio of 5.7:1), and that heating was omitted, thereby obtaining a sheet molding compound (950 g, a carbon fiber content: 10 wt %).

Example 8

Procedures of Example 1 were repeated, except that 21 g of methyl ethyl ketone was replaced with 35 g of ethylene glycol diglycidyl ether, and 40 g of the second epoxy resin-based material was replaced with 565 g of an another second epoxy resin-based material (containing epoxy resin and blocked amine hardener in a weight ratio of 7.8:1), and that heating was omitted, thereby obtaining a sheet molding compound (700 g, a carbon fiber content: 10 wt %).

Example 9

Procedures of Example 2 were repeated, except that the weight of the second epoxy resin-based material was changed from 90 g to 35 g and the weight of methyl ethyl ketone was changed from 9.5 g to 20.25 g, thereby obtaining a sheet molding compound (135 g, a carbon fiber content: 70 wt %).

Comparative Example 1

Procedures of Example 1 were repeated, except that the weight of methyl ethyl ketone was changed from 21 g to 28 g, thereby obtaining a sheet molding compound (140 g, a carbon fiber content: 50 wt %).

Comparative Example 2

Procedures of Example 1 were repeated, except that the weight of methyl ethyl ketone was changed from 21 g to 70 g, thereby obtaining a mixture that could not be formed into a sheet molding compound.

Figure 3:
FIG. 3 is a photograph image of a mixture of Comparative Example 2.

A photograph image of the mixture is shown in FIG. 3.

Comparative Example 3

Procedures of Example 2 were repeated, except that methyl ethyl ketone was not added, and a mixture was formed, in which agglomeration of the first and second epoxy resin-based materials was observed and carbon fibers was unevenly blended with the first and second epoxy resin-based materials, thereby obtaining a sheet molding compound (190 g, a carbon fiber content: 50 wt %).

Comparative Example 4

Procedures of Example 1 were repeated, except that methyl ethyl ketone was not added, and a mixture was formed, in which carbon fibers were unevenly blended with the first and second epoxy resin-based materials, thereby obtaining a sheet molding compound (140 g, a carbon fiber content: 50 wt %).

Comparative Example 5

Procedures of Example 2 were repeated, except that 9.5 g of methyl ethyl ketone was replaced with 57 g of ethylene glycol diglycidyl ether, and 90 g of the second epoxy resin-based material was replaced with 33 g of an another second epoxy resin-based material (containing epoxy resin and blocked amine hardener in a weight ratio of 3.4:1), and that heating was omitted to form a mixture, thereby obtaining a sheet molding compound (190 g, a carbon fiber content: 50 wt %).

Comparative Example 6

Procedures of Example 2 were repeated, except that the weight of the second epoxy resin-based material was changed from 90 g to 850 g without addition of methyl ethyl ketone, and that heating was omitted, thereby obtaining a sheet molding compound (950 g, a carbon fiber content: 10 wt %).

Comparative Example 7

Procedures of Example 2 were repeated, except that the weight of methyl ethyl ketone was changed from 9.5 g to 190 g and the weight of the second epoxy resin-based material was changed from 90 g to 850 g, thereby obtaining a sheet molding compound (950 g, a carbon fiber content: 10 wt %).

Comparative Example 8

Procedures of Example 1 were repeated, except that 21 g of methyl ethyl ketone was replaced with 180 g of ethylene glycol diglycidyl ether and 40 g of the second epoxy resin-based material was replaced with 420 g of an another second epoxy resin-based material (containing epoxy resin and blocked amine hardener in a weight ratio of 8.3:1) and that heating was omitted, thereby obtaining a sheet molding compound (700 g, a carbon fiber content: 10 wt %).

Comparative Example 9

Procedures of Example 1 were repeated, except that methyl ethyl ketone and the second epoxy resin-based material were not added to obtain the viscous blend, in which the first epoxy resin-based material could not be mixed with the carbon fibers, and thus could not be used to obtain a sheet molding compound.

Comparative Example 10

Procedures of Example 2 were repeated, except that methyl ethyl ketone and the second epoxy resin-based material were not added to obtain the viscous blend, in which the first epoxy resin-based material could not be mixed with the carbon fibers, and thus could not be used to obtain a sheet molding compound.

Figure 4:
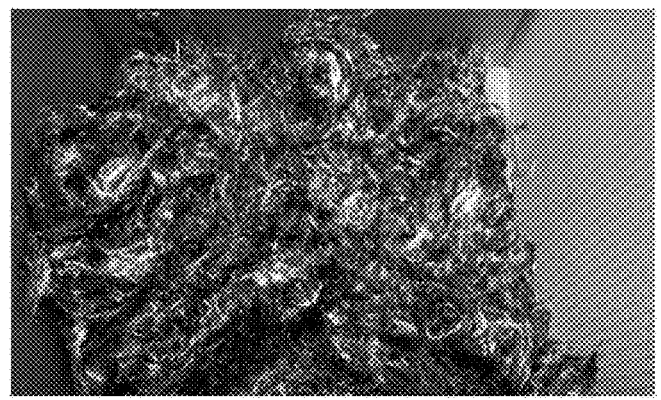
FIG. 4 is a photograph image of a viscous blend of Comparative Example 10.

A photograph image of the viscous blend is shown in FIG. 4.

Three-Point Bending Test:

A specimen (100 mm×20 mm×2 mm) was cut from each of the sheet molding compounds of Examples 1 to 9 and Comparative Examples 1, 5, and 7 to 9, and flexural strength of the specimen was measured by a three-point bending test using a universal testing machine (Manufacturer: Gotech Testing Machines Inc., Taiwan, Model. GT-AI-7000 L) according to ASTM D-790. The three-point bending test was implemented with a loading speed of 6.3 mm/min and a support span of 80 mm. The results are shown in Table 1 below.

TABLE 1

|  | A content of carbon fibers in a sheet molding compound (wt %)[1] | A content of the first epoxy resin-based material in a sheet molding compound (wt %)[1] | An added amount of the second epoxy resin-based material in a sheet molding compound (wt %)[1] | An added amount of ethylene glycol diglycidyl ether (wt %)[1] | An added amount of methyl ethyl ketone (wt %)[1] | Flexural strength (MPa) |
|---|---|---|---|---|---|---|
| Example 1 | 50 | 21.43 | 28.57 | 0 | 15 | 498 |
| Example 2 | 50 | 2.64 | 47.36 | 0 | 5 | 512 |
| Example 3 | 50 | 21.43 | 23.57 | 5 | 0 | 473 |
| Example 4 | 50 | 2.64 | 22.36 | 25 | 0 | 420 |
| Example 5 | 10 | 0.53 | 89.47 | 0 | 15 | 123 |
| Example 6 | 10 | 4.29 | 85.71 | 0 | 5 | 158 |

TABLE 1-continued

|  | A content of carbon fibers in a sheet molding compound (wt %)[1] | A content of the first epoxy resin-based material in a sheet molding compound (wt %)[1] | An added amount of the second epoxy resin-based material in a sheet molding compound (wt %)[1] | An added amount of ethylene glycol diglycidyl ether (wt %)[1] | An added amount of methyl ethyl ketone (wt %)[1] | Flexural strength (MPa) |
|---|---|---|---|---|---|---|
| Example 7 | 10 | 0.53 | 64.47 | 25 | 0 | 111 |
| Example 8 | 10 | 4.29 | 80.71 | 5 | 0 | 165 |
| Example 9 | 70 | 4.07 | 25.93 | 0 | 15 | 479 |
| Comparative Example 1 | 50 | 21.43 | 28.57 | 0 | 20 | 20 |
| Comparative Example 2 | —[2] | —[2] | —[2] | 0 | 50[3] | — |
| Comparative Example 3 | 50 | 2.64 | 47.36 | 0 | 0 | 10-50 Uneven mixing |
| Comparative Example 4 | 50 | 21.43 | 28.57 | 0 | 0 | 10-50 Uneven mixing |
| Comparative Example 5 | 50 | 2.64 | 17.36 | 30 | 0 | 57 |
| Comparative Example 6 | 10 | 0.53 | 89.47 | 0 | 0 | 5-30 Uneven mixing |
| Comparative Example 7 | 10 | 0.53 | 89.47 | 0 | 20 | 37 |
| Comparative Example 8 | 10 | 4.29 | 60.00 | 25.71 | 0 | 65 |
| Comparative Example 9 | —[2] | —[2] | —[2] | 0 | 0 | — |
| Comparative Example 10 | —[2] | —[2] | —[2] | 0 | 0 | — |

[1]based on a total weight of the sheet molding compound
[2]the sheet molding compound was not obtained
[3]based on a total weight of the mixture obtained thereby As shown in Table 1, the sheet molding compounds of Examples 1 to 9 have satisfactory flexural strength values which range from 111 MPa to 512 MPa.

Contrarily, in Comparative Examples 1 and 7, the added amount of methyl ethyl ketone (an example of a non-reactive diluent) is 20 wt % (i.e., larger than 15 wt %) based on a total weight of the sheet molding compound, and thus, the flexural strength of the sheet molding compounds obtained thereby is significantly decreased.

In Comparative Example 2, the added amount of methyl ethyl ketone is 50 wt % (i.e., much larger than 15 wt %) based on a total weight of the mixture obtained thereby, and the mixture cannot be preformed into a sheet molding compound.

In Comparative Examples 3, 4, and 6, since neither methyl ethyl ketone nor ethylene glycol diglycidyl ether (an example of a reactive diluent) is added, carbon fibers dispersed unevenly in the mixture formed thereby.

In Comparative Examples 5 and 8, the added amount of ethylene glycol diglycidyl ether is 30 wt % (i.e., larger than 25 wt %) based on a total weight of the sheet molding compound, and thus, the flexural strength of the sheet molding compounds obtained thereby is significantly decreased.

In Comparative Examples 9 and 10, since none of the epoxy resin-based material, methyl ethyl ketone, and ethylene glycol diglycidyl ether is added, carbon fibers dispersed unevenly in the mixture formed thereby.

In view of the aforesaid, in the method for preparing a fiber-containing molding compound according to the disclosure, prepreg waste fragments is mixed with a diluent and a resin-based material in specific amounts such that a mixture is formed, in which a reaction equivalent ratio is controlled in a specific range. Therefore, a fiber-containing molding compound prepared thereby has a fiber content that is adjustable according to specific requirements, and that possesses satisfactory mechanical properties for further processing with other molding material(s) so as to produce various molded articles.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for preparing a fiber-containing molding compound, comprising the acts of:
   a) providing a composite material which includes a first resin and fibers impregnated with the first resin;
   b) mixing the composite material with a treatment medium which includes a diluent to form a mixture; and
   c) pressing the mixture to obtain the fiber-containing molding compound which is in a form of a sheet molding compound.

2. The method according to claim 1, wherein in act b), the treatment medium further includes a resin-based material which includes a resin hardener and a second resin that is miscible with the first resin.

3. The method according to claim 2, wherein in act b), a reaction equivalent ratio of a combination of the first resin, the second resin, and the diluent to the resin hardener in the mixture is in a range from 0.1:1 to 10:1.

4. The method according to claim 2, wherein in act b), the resin-based material is used in an amount ranging from 10 wt % to 90 wt % based on a total weight of the fiber-containing molding compound.

5. The method according to claim 2, wherein the second resin in the resin-based material is in an amount ranging from 20 wt % to 90 wt % based on a weight of the resin-based material.

6. The method according to claim 2, wherein the second resin is the same as the first resin.

7. The method according to claim 6, wherein both the first resin and the second resin are selected from the group consisting of epoxy-based resin, phenolic-based resin, unsaturated polyester-based resin, furan-based resin, vinyl ester-based resin, polyurethane-based resin, and combinations thereof.

8. The method according to claim 7, wherein both the first resin and the second resin are the epoxy-based resin.

9. The method according to claim 1, wherein in act b), the diluent is selected from the group consisting of a reactive diluent, a non-reactive diluent, and a combination thereof.

10. The method according to claim 9, wherein the diluent is the reactive diluent and is used in an amount ranging from 5 wt % to 25 wt % based on a total weight of the fiber-containing molding compound.

11. The method according to claim 9, wherein the diluent is the non-reactive diluent and is used in an amount ranging from 5 wt % to 15 wt % based on a total weight of the fiber-containing molding compound.

12. The method according to claim 11, further comprising after act b), an act of removing the non-reactive diluent from the mixture.

13. The method according to claim 9, wherein the diluent is the combination of the reactive diluent and the non-reactive diluent, which are used in amounts ranging from 5 wt % to 25 wt % and from 5 wt % to 15 wt %, respectively, based on a total weight of the fiber-containing molding compound.

14. The method according to claim 13, further comprising after act b), an act of removing the non-reactive diluent from the mixture.

15. The method according to claim 9, wherein the reactive diluent is selected from the group consisting of neopentyl glycol diglycidyl ether, cresyl glycidyl ether, benzyl glycidyl ether, 1,6-hexanediol diglycidyl ether, polypropylene glycol diglycidyl ether, fatty glycidyl ether, ethylene glycol diglycidyl ether, phenyl glycidyl ether, 1,4-butanediol diglycidyl ether, butyl glycidyl ether, alkylene glycidyl ether, styrene, methylstyrene, methacrylic acid monomer, and combinations thereof.

16. The method according to claim 9, wherein the non-reactive diluent is selected from the group consisting of acetone, butanone, toluene, xylene, ethanol, dimethyl formamide, ethyl acetate, butyl acetate, benzyl alcohol, and combinations thereof.

17. The method according to claim 1, wherein act b) is implemented at a temperature ranging from 10° C. to 100° C.

18. The method according to claim 1, wherein the mixture obtained in act b) is the fiber-containing molding compound which is in a form of a bulk molding compound.

19. The method according to claim 18, further comprising after act b), an act of subjecting the bulk molding compound to a B-stage curing treatment.

20. The method according to claim 1, further comprising after act b), an act of: c) preforming the mixture to obtain the fiber-containing molding compound.

21. The method according to claim 1, further comprising after act c), an act of subjecting the sheet molding compound to a B-stage curing treatment.

22. The method according to claim 1, wherein in act a), the composite material includes composite fragments, each of which is in a form of a partially cured construction of the first resin and the fibers.

23. The method according to claim 22, further comprising prior to act a), an act of fragmenting composite scraps by cutting to obtain the composite fragments.

* * * * *